UNITED STATES PATENT OFFICE 2,493,927

METHYLENEDIOXYPHENYL COMPOUND AS INSECTICIDE, INSECT REPELLENT, AND PYRETHRIN SYNERGIST

Edward A. Prill, Yonkers, N. Y., assignor to Boyce Thompson Institute for Plant Research, Inc., a corporation of New York No Drawing. Application February 8, 1946, Serial No. 646,492

4 Claims. (Cl. 167—33)

This invention relates to organic chemical compounds and has for its object the provision of certain new organic compounds and insecticidal compositions comprising the compounds. I have discovered a series of organic compounds which I have synthesized and found to be markedly active as insecticides. The compounds of the invention are effective insecticides alone and also increase the effectiveness of other insecticides. The compounds of the invention compare favorably with or exceed the extracts of pyrethrin and rotenone bearing plants in toxicity to insects. In admixtures with pyrethrin, the compounds manifest pronounced synergistic effects.

One of the advantageous features of the invention is that the compounds may be produced from readily available substances by a simple, practical, and economical manufacturing process. Another important feature of the compounds of the invention is that they are readily soluble in the petroleum distillates commonly used as solvents in insecticidal sprays.

The new compounds which I have discovered are organic sulfides belonging to the class of sulfur substituted mercaptodihydrosafroles in which the substituted mercapto sulfur atom is attached to a carbon atom of the side chain. These compounds are designated by the general formula:

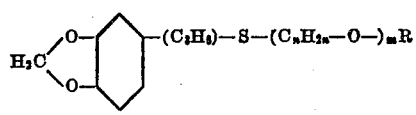

where $n$ is an integer 2 or 3, $m$ is an integer not greater than 3, and R is an univalent radical of the group consisting of alkyl, aryl, alkaryl and aralkyl radicals, and nuclear mono substituted aryl, alkaryl and aralkyl radicals in which the nuclear substitutent is a member of the group consisting of halogen and alkoxy; and in the above formula, the portion to the right of the sulfur atom contains not more than 16 carbon atoms.

The compounds of the invention can be made by the peroxide catalyzed addition reaction of a mercaptan of the formula $HS-(C_nH_{2n}-O-)_mR$, where $n$, $m$, and R are as previously defined, and a 3,4 - methylenedioxyphenyl - propylene such as safrole and isosafrole.

When safrole is used in this reaction, the reaction is represented by the probable equation:

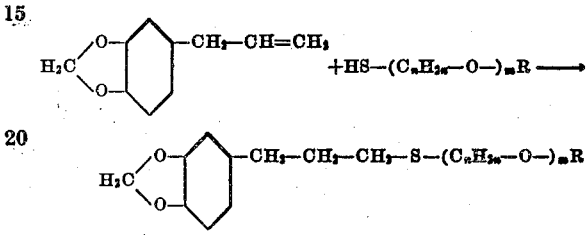

When isosafrole is used in this reaction, the reaction is represented by the probable equation:

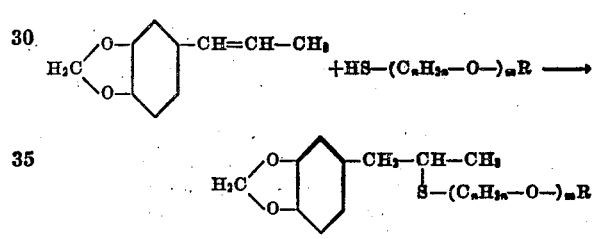

Frequently it is not necessary to specially provide an organic peroxide to catalyze the reaction because some organic peroxidic matter is already present as a result of unavoided autoxidation of a component of the reaction mixture.

The following general methods were used for the formation and purification of the new insecticides illustrating this invention.

Of the mercaptans of the formula,

$$HS-(C_nH_{2n}-O-)_mR$$

that were used as intermediates, some were obtained from commercial sources and others were synthesized by the general laboratory method consisting of the reaction of a reactive chloro or bromo compound with thiourea and subsequent hydrolysis of the intermediary sulfur substituted thiourea salt to a mercaptan. In practice, however, the mercaptans may be produced by any suitable method. As a special case, certain of the monomercaptans may be considered to be formed as intermediates in the reaction of a dimercapto compound, such as $\beta,\beta'$-dimercaptodiethyl ether, with safrole or isosafrole. The intermediary monomercaptan, which also contains a thio ether linkage, satisfies the description of the formula, RSH, and can in turn undergo further reaction with safrole or isosafrole.

For the formation of the various insecticides, the two reactants were mixed in the proportions indicated as follows: 0.1 mole of a monomercaptan and 0.1 mole of safrole; 0.1 mole of a monomercaptan and 0.1 mole of isosafrole; 0.1 mole of $\beta,\beta'$-dimercaptodiethyl ether and 0.3 mole, a liberal excess, of safrole; and 0.1 mole of $\beta,\beta'$-dimercaptodiethyl ether and 0.3 mole, a liberal excess, of isosafrole. To each mixture were added a few drops of ascaridole in order to insure the presence of a peroxidic catalyst. The reaction mixtures containing ethyl mercaptan were allowed to stand in pressure bottles at room temperature for two weeks in order to bring about the addition reaction. The addition reactions of n-butyl mercaptan, p-tolyl mercaptan, and benzyl mercaptan with isosafrole were similarly effected at room temperature, and it was also possible to effect these addition reactions more rapidly at 100° C. For all the other addition reactions, the reaction mixtures contained in flasks provided with reflux condensers were warmed at about 100° C. on a steam table for about 48 hours. The addition reaction of n-butyl mercaptan with safrole also was successfully effected at 100° C. by using a trace of benzoyl peroxide in place of ascaridole. By using somewhat aged samples of safrole and isosafrole, the addition reactions of these with n-butyl mercaptan also were successfully effected at 100° C. without the special addition of a peroxide.

At the termination of the reaction period, the reaction mixture was in each case mixed with petroleum ether or with ethyl ether when the compound was not sufficiently soluble in the former solvent, and the solution shaken with 10 per cent aqueous potassium hydroxide to wash out any remaining mercaptan. The organic solvent was then evaporated. When possible, the product was fractionally distilled in vacuo. When so distilled, the boiling point ranges of the compound are indicated with the data in Table I and Table II. The other compounds, which were non-distillable or difficult to distill, were purified by removal of any steam distillable impurities as well as any unreacted safrole or isosafrole by steam distillation. The oily compound remaining in the distilling flask was then taken up in ethyl ether, the solution dried over anhydrous sodium sulfate, then filtered, and the solvent evaporated. The compounds which were purified by steam distillation were free of any unpleasant odor. The removal of any malodorous impurities by steam distillation is also applicable to the compounds which were fractionally distilled in vacuo; however, those compounds made with butyl or lower molecular weight mercaptans also may pass into the steam distillate to an appreciable extent if the steam distillation process is prolonged. Steam distillation may be employed in lieu of fractional distillation in vacuo, or subsequent thereto, to remove the last trace of any malodorous impurity. Of the compounds prepared, all were viscous oily liquids at room temperature. All of the compounds with the exception of those containing a tetrahydrofurane residue or a benzene nucleus in the substituent were very soluble in Deo-Base, a purified petroleum distillate.

Various adaptations of the process of making the compounds may be used. After termination of the reaction period, the crude product may be used directly for insecticidal purposes, or any unreacted mercaptan only may be removed by a process such as washing with an aqueous solution of an alkali. Any safrole or isosafrole remaining in the product ordinarily would not be objectionable. The reactants may be used in any proportions except when a dimercapto compound is used, in which case the molar concentration of a dimercapto compound should not be more than one-half the molar concentration of the other reactant. Any excess mercaptan may be recovered by extraction or distillation and any excess safrole or isosafrole either may be recovered by direct distillation or steam distillation, or it may be left in the product. In general, safrole, isosafrole, a mixture of safrole and isosafrole or an essential oil containing a substantial amount of safrole, isosafrole or both may be used in the reaction with a mercaptan or a mixture of mercaptans, and the crude product may be used directly, or it may be subjected to any of previously outlined methods for partial or complete purification. Any of a great variety of organic peroxidic substances may be used as catalyst, or peroxidic substances naturally present as a result of autoxidation may serve the purpose. Any reaction temperature from room temperature up to a temperature just below the point at which serious decomposition of the product occurs may be used. A temperature up to 250° C. may be considered usable.

In addition to the compounds that are presented herein as specific examples, the compounds of the invention may be any other compound of the class which bears a suitable substituent radical containing not more than sixteen carbon atoms. The substituent radical may be any one of the following radicals: an alkyl, an alkenyl, an aralkyl, a nuclear halogenated aralkyl, a nuclear alkyl substituted aralkyl, an alkyl substituted aryl, a methylenedioxyphenylalkyl, a cycloalkyl-alkyl, and a radical characterized as being any of the above-listed radicals in which the contingent relation of the carbon atoms is interrupted by one or more oxygen atoms in ether structure or by one or more sulfur atoms in thio ether structure, or by both; also a radical containing as substituent to an alkyl or to an oxygen interrupted alkyl radical, a cyclic ether structure, such as a tetrahydrofurane residue, a tetrahydropyran residue, a dioxane residue, or the like; also a cycloalkyl, an arylcycloalkyl, an aryl, and a nuclear halogenated aryl.

Spray solutions containing the compounds illustrating this invention were tested against houseflies by the Large Group Peet-Grady Method ("Blue Book" pp. 177–181, MacNair-Dorland Co., New York, 1939). Control tests with the Official Test Insecticide (OTI) (Soap and Sanitary Chemicals 21(6): 137, 141, June, 1945), which contains approximately 0.1 g. of pyrethrins per 100 ml., also were carried out on each batch of flies used. The compounds, except those containing a tetrahydrofurane residue or a benzene nucleus in the substituent radical, were dissolved in Deo-Base, a purified petroleum distillate. The compounds containing a tetrahydrofurane residue or a benzene nucleus in the substituent radical were dissolved in a mixture of Deo-Base and not more than 5 per cent acetone. Solutions of some of the compounds without added pyrethrins were tested. One or more solutions of each of the compounds in admixture with small amounts of pyrethrins were tested, the amount of admixed pyrethrins being 0.025 or 0.05 g. per 100 ml. Tests on solutions containing pyrethrins alone in the amount of 0.025 g. per 100 ml. showed an average 10-minute knockdown of 84 per cent and, after adjusting the 24-hour kills to an OTI kill of 50 per cent, an average 24-hour adjusted kill of 21 per cent. Tests on solutions containing pyrethrins alone in the amount of 0.05 g. per 100 ml. showed an average 10-minute knockdown of 93 per cent, and after adjusting the 24-hour kills to an OTI kill of 50 per cent, an average adjusted kill of 32 per cent.

Table I gives the results of the tests with solutions containing members of the series of compounds made from safrole and mercaptans, and Table II gives the results of the tests with solutions containing members of the series of compounds made from isosafrole and mercaptans.

The compounds tested without admixed pyrethrins showed considerable paralyzing and killing ability. However, for fly sprays it is more practical to use the compounds in admixture with a small amount of pyrethrins with which they exhibit synergistic action, the pyrethrins also contributing to a rapid knockdown.

The compounds of both series which contain ethereal oxygen in the substituent radical regularly showed greater insecticidal activity toward houseflies than did the related compounds which do not contain ethereal oxygen in the substituent. This was most evident when comparison is made of the results obtained with solutions containing 0.025 g. admixed pyrethrins per 100 ml.

A compound made from isosafrole and a mercaptan containing ethereal oxygen frequently showed a greater insecticidal activity toward houseflies than did a compound made from safrole and the same mercaptan.

Each of the compounds when tested in admixture with a small amount of pyrethrins contributed to a higher percentage 10-minute knockdown than could be attributed to the pyrethrins alone. A practical application of this is the use of a compound of the class in admixture with 2,2-bis-p-chlorophenyl-1,1,1-trichloroethane (DDT) and a minimum amount of pyrethrins. DDT is an excellent insect killer, but it produces a very slow knockdown and for this reason pyrethrins are often admixed with it to provide a rapid knockdown. It is shown by the data for compound No. 3 of Table I and compound No. 16 of Table II that by halving that amount of pyrethrins, which when used in admixture with DDT produced an inadequate 10-minute knockdown, and adding a compound of this invention, a more satisfactory knockdown was obtained as well as an increased kill.

The fact that the marked insecticidal properties of the compounds illustrating this invention were not pre-existent as attributes of any of the substances from which the compounds were made by a process of chemical combination is shown by the following results. A spray solution containing 3 g. of safrole and 0.025 g. of pyrethrins per 100 ml. and a spray solution containing 3 g. of isosafrole and 0.025 g. of pyrethrins per 100 ml. each gave a knockdown and a kill which were not significantly different from the knockdown and the kill given by 0.025 g. pyrethrins alone per 100 ml. Also several of the mercaptans of the types used in the preparation of the compounds, when similarly tested in the form of solutions with admixed small amounts of pyrethrins, caused no significantly greater knockdowns and no significantly greater kills than were given by the small amounts of pyrethrins alone.

Representative members of the compounds which were tested against houseflies were also tested against certain agricultural insects. For these tests a weighed amount of a compound dissolved in 10 ml. of acetone was mixed with 90 ml. of a 0.1 per cent solution of sodium lauryl sulfate, the resulting emulsion sprayed on insect infested leaves and, after holding the sprayed insect infested leaves in Petri dishes for 20 hours, the results were determined.

When the insecticides were tested against *Aphis rumicis* on nasturtium leaves, a percentage kill of over 70 per cent was obtained with a 0.1 per cent emulsion of each of the following compounds: Numbers 3, 9 and 10 of the compounds listed in Table I, and numbers 16, 24 and 25 of the compounds listed in Table II.

When the insecticides were tested against pea aphids on horse bean leaves, a percentage kill of over 78 per cent was obtained with a 0.1 per cent emulsion of each of the following compounds: Numbers 3, 9 and 10 of the compounds listed in Table I, and numbers 16, 24 and 25 of the compounds listed in Table II.

When the insecticides were tested against onion thrips on onion leaves, a percentage kill of over 80 per cent was obtained with a 0.1 per cent emulsion of each of the following: Numbers 16 and 25 of the compounds listed in Table II.

When the insecticides were tested against a thrips species on chicory leaves, a percentage kill of over 87 per cent was obtained by the use of a 0.1 per cent emulsion of each of the following compounds: Numbers 3, 9 and 10 of the compounds listed in Table I and numbers 16, 24 and 25 of the compounds listed in Table II.

When similar tests were performed on Mexican bean beetle larvae on bush bean leaves with the use of 0.2 per cent emulsion of each of the following compounds, number 7 of the compounds listed in Table I, and numbers 16, 24 and 25 of the compounds listed in Table II, a few of the larvae were killed in each instance, but it was significant that no feeding occurred during the 48-hour period of the test. This shows that the compounds had a repellent action against this insect.

Table I

[Results of the Peet-Grady tests on houseflies with solutions containing compounds of the probable formula:

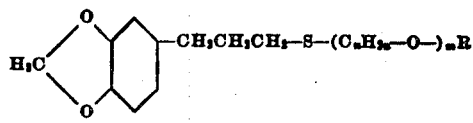
$-CH_2CH_2CH_2-S-(C_nH_{2n}-O-)_mR$ each of said compounds being the peroxide catalyzed addition reaction product of equimolar portions of safrole and a mercaptan of the formula $HS-(C_nH_{2n}-O-)_mR$.]

| Compound No. | $(C_nH_{2n}-O-)_mR$ | Boiling point range, °C./mm. | Compound, g./100 ml. | Pyrethrins, g./100 ml. | 10-Minute knockdown, Per cent | 24-Hour kill, Per cent | 24-Hour OTI kill, Per cent | Increase over the OTI kill, Per cent |
|---|---|---|---|---|---|---|---|---|
| 1 | $-(CH_2)_2-O-C_2H_5$ 2-Ethoxyethyl | 174–175/1 | 1.0 | 0 | 95 | 87 | 55 | +32 |
|  | do | | .4 | .025 | 96 | 79 | 57 | +22 |
| 2 | $-(CH_2)_2-O-(CH_2)_3CH_3$ 2-n-Butoxyethyl | 182–185/1 | 1.0 | 0 | 84 | 80 | 63 | +17 |
|  | do | | .2 | .05 | 98 | 81 | 50 | +31 |
| 3 | $-(CH_2)_2-O-(CH_2)_2-O-(CH_2)_3CH_3$ 2-(2-n-Butoxyethoxy)ethyl | 204–207/1 | 1.0 | 0 | 96 | 95 | 66 | +29 |
|  | do | | .4 | 0 | 51(74) | 66 | 55 | +11 |
|  | do | | .4 | .025 | 96 | 84 | 55 | +29 |
|  | do | | .2 | .0125 | 95 | 71 | 48 | +23 |
|  | do | | 0 | .025 plus .1 g. DDT. | 89 | 86 | 48 | +38 |
|  | do | | .2 | .0125 plus .1 g. DDT. | 96 | 95 | 48 | +47 |
| 4 | $-(CH_2)_2-O(CH_2)_2-O-(CH_2)_5CH_3$ 2-(2-n-Hexyloxyethoxy)ethyl | | 1.0 | 0 | 73 | 68 | 55 | +13 |
|  | do | | .8 | .025 | 99 | 99 | 62 | +37 |
|  | do | | .4 | .025 | 95 | 79 | 62 | +17 |
| 5 | $-(CH_2)_2-O-(CH_2)_2-O-(CH_2)_2-O-(CH_2)_3CH_3$ 2-[2-(2-n-Butoxyethoxy)ethoxy]ethyl | | 1.0 | 0 | 92(97) | 92 | 62 | +30 |
|  | do | | .6 | .025 | 99 | 80 | 54 | +26 |
| 6 | $-(CH_2)_2-O-CH_2CH-O-CH_2$ with $CH_2-CH_2$ ring; 3-Tetrahydrofurfuryloxypropyl | | 1.0 | 0 | 95 | 93 | 66 | +27 |
|  | do | | .4 | .025 | 100 | 92 | 62 | +30 |
| 7 | $-(CH_2)_2-O-$<phenyl>; 2-Phenoxyethyl | | 1.0 | 0 | 80 | 77 | 66 | +11 |
|  | do | | .2 | .025 | 96 | 67 | 48 | +19 |
| 8 | $-(CH_3)-O-$<phenyl with CH_3 and CH(CH_3)_2>; 2-Thymoxyethyl | | 1.0 | 0 | 68 | 45 | 65 | −20 |
|  | do | | 1.0 | .025 | 99 | 73 | 65 | +8 |
| 9 | $-(CH_2)_2-O-(CH_2)_2-O-$<phenyl>; 2-(2-Phenoxyethoxy)ethyl | | 1.0 | 0 | 99 | 98 | 65 | +23 |
|  | do | | .4 | .025 | 97 | 87 | 50 | +37 |
|  | do | | .2 | .025 | 97 | 66 | 46 | +20 |
| 10 | $-(CH_2)_2-O-CH_2-$<phenyl>; 2-Benzoxyethyl | | 1.0 | 0 | 90(95) | 92 | 65 | +27 |
|  | do | | .4 | .025 | 98 | 71 | 43 | +28 |
|  | do | | .2 | .025 | 95 | 55 | 43 | +12 |
| 11 | $-(CH_2)_2-O-$<phenyl>$-O-CH_3$; 3-(p-Methoxyphenoxy)propyl | | 1.0 | 0 | 88(92) | 88 | 62 | +26 |
|  | do | | .4 | .025 | 97 | 92 | 57 | +35 |
|  | do | | .2 | .025 | 95 | 68 | 53 | +15 |
| 12 | $-(CH_2)_2-O-(CH_2)_2-O-$<phenyl with O-CH_3>; 2-[2-(m-Methoxyphenoxy)ethoxy]ethyl | | .4 | .025 | 98 | 84 | 53 | +31 |
| 13 | $-(CH_2)_2-O-(CH_2)_2-S-(CH_2)_2-$<benzodioxole with CH_2> | | 1.0 | 0 | 69 | 63 | 46 | +17 |
|  | do (this compound being made from two moles of safrole and one mole of β,β'-dimercaptodiethyl ether.) | | .4 | .025 | 96 | 82 | 56 | +26 |

The figures indicated in parentheses are percentages of the knockdown based upon the number of flies that were down at the end of the process of picking up the paralyzed flies. This was about 15 minutes after application of the spray.

Table II

[Results of the Peet-Grady tests on houseflies with solutions containing compounds of the probable formula:

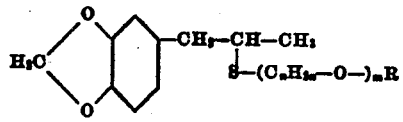

each of said compounds being the peroxide catalyzed addition reaction product of equimolar portions of isosafrole and a mercaptan of the formula $HS-(C_nH_{2n}-O-)_mR$.]

| Compound No. | $(C_nH_{2n}-O-)_mR$ | Boiling point range, °C./mm. | Compound, g./100 ml. | Pyrethrins, g./100 ml. | 10-Minute knockdown, Per cent | 24-Hour kill, Per cent | 24-Hour OTI kill, Per cent | Increase over the OTI kill, Per cent |
|---|---|---|---|---|---|---|---|---|
| 14 | $-(CH_2)_2-O-C_2H_5$ 2-Ethoxyethyl | 164–167/1 | 1.0 | 0 | 83 | 76 | 55 | +21 |
|  | do |  | .4 | .025 | 99 | 87 | 57 | +30 |
| 15 | $-(CH_2)_2-O-(CH_2)_3CH_3$ 2-n-Butoxyethyl | 169–172/1 | 1.0 | 0 | (82) | 78 | 63 | +15 |
|  | do |  | .4 | .025 | 95 | 86 | 62 | +24 |
|  | do |  | .2 | .05 | 98 | 90 | 51 | +39 |
| 16 | $-(CH_2)_2-O-(CH_2)_2-O-(CH_2)_3CH_3$ 2-(2-n-Butoxyethoxy)ethyl | 194–197/1 | .4 | 0 | 69(75) | 71 | 55 | +16 |
|  | do |  | .4 | .025 | 98 | 90 | 55 | +35 |
|  | do |  | .2 | .025 | 99 | 76 | 55 | +21 |
|  | do |  | .1 | .025 | 99 | 69 | 52 | +17 |
|  | do |  | .15 | .0125 | 92 | 42 | 40 | +2 |
|  | do |  | 0 | .025 plus .1 g. DDT per 100 ml. | 82 | 69 | 40 | +29 |
|  | do |  | .15 | .0125 plus .1 g. DDT per 100 ml. | 95 | 87 | 40 | +47 |
| 17 | $-(CH_2)_2-O-(CH_2)_2-O-(CH_2)_5CH_3$ 2-(2-n-Hexyloxyethoxy)ethyl |  | 1.0 | 0 | 83 | 82 | 55 | +27 |
|  | do |  | .2 | .025 | 96 | 69 | 51 | +18 |
| 18 | $-(CH_2)_2-O-(CH_2)_2-O-(CH_2)_2-O-(CH_2)_3CH_3$ 2-[2-(2-n-Butoxyethoxy)ethoxy]ethyl |  | 1.0 | 0 | 94(97) | 96 | 62 | +34 |
|  | do |  | .2 | .025 | 98 | 78 | 62 | +16 |
| 19 | $-(CH_2)_2-O-CH_2CH\overset{CH_2\text{——}CH_2}{-O-CH_2}$ 3-Tetrahydrofurfuryloxypropyl |  | 1.0 | 0 | 92 | 91 | 66 | +25 |
|  | do |  | .4 | .025 | 99 | 98 | 62 | +36 |
|  | do |  | .2 | .025 | 98 | 64 | 51 | +13 |
| 20 | $-(CH_2)_2-O-(CH_2)_2-O-CH_2CH\overset{CH_2\text{——}CH_2}{-O-CH_2}$ 2-(2-Tetrahydrofurfuryloxyethoxy)ethyl |  | 1.0 | 0 | 97 | 97 | 55 | +42 |
|  | do |  | .2 | .025 | 97 | 64 | 50 | +14 |
| 21 | $-(CH_2)_2-O-\text{C}_6\text{H}_5$ 2-Phenoxyethyl |  | 1.0 | 0 | 80 | 77 | 66 | +11 |
|  | do |  | .2 | .025 | 94 | 71 | 48 | +23 |
| 22 | $-(CH_2)_2-O-\text{C}_6\text{H}_4-\text{Cl}$ 2-(p-Chlorophenoxy)ethyl |  | 1.0 | 0 | 73 | 72 | 55 | +17 |
|  | do |  | .2 | .025 | 94 | 68 | 45 | +23 |
| 23 | $-(CH_2)_2-O-\text{C}_6\text{H}_3(CH_3)(CH(CH_3)_2)$ 2-Thymoxyethyl |  | 1.0 | 0 | 59 | 47 | 65 | −18 |
|  | do |  | 1.0 | .025 | 99 | 79 | 65 | +14 |
| 24 | $-(CH_2)_2-O-(CH_2)_2-O-\text{C}_6\text{H}_5$ 2-(2-Phenoxyethoxy)ethyl |  | 1.0 | 0 | 94 | 94 | 65 | +29 |
|  | do |  | .4 | .025 | 96 | 90 | 50 | +40 |
|  | do |  | .2 | .025 | 97 | 73 | 45 | +28 |
| 25 | $-(CH_2)_2-O-CH_2-\text{C}_6\text{H}_5$ 2-Benzoxyethyl |  | 1.0 | 0 | 90(93) | 91 | 65 | +26 |
|  | do |  | .2 | .025 | 96 | 75 | 45 | +30 |
|  | do |  | .1 | .025 | 98 | 60 | 41 | +19 |
| 26 | $-(CH_2)_2-O-\text{C}_6\text{H}_4-O-CH_3$ 3-(p-Methoxyphenoxy)propyl |  | 1.0 | 0 | 88(92) | 88 | 62 | +26 |
|  | do |  | .4 | .025 | 97 | 81 | 60 | +21 |

Table II—Continued

| Compound No. | $(C_nH_{2n}-O-)_mR$ | Boiling point range, °C./mm. | Compound, g./100 ml. | Pyrethrins, g./100 ml. | 10-Minute knockdown, Per cent | 24-Hour kill, Per cent | 24-Hour OTI kill, Per cent | Increase over the OTI kill, Per cent |
|---|---|---|---|---|---|---|---|---|
| 27 |  2-[2-(m-Methoxyphenoxy)ethoxy]ethyl | | .4 | .025 | 99 | 94 | 53 | +41 |
| 28 | 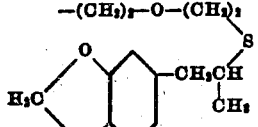 (this compound being made from two moles of isosafrole and one mole of β,β'-dimercaptodiethyl ether) | | 1.0 .2 | 0 .025 | 55(66) 95 | 65 70 | 46 46 | +19 +24 |

The figures indicated in parentheses are the percentages of the knockdown based upon the number of flies that were down at the end of the process of picking up the paralyzed flies. This was about 15 minutes after application of the spray.

I claim:

1. An insecticidal composition comprising an organic compound represented by the formula

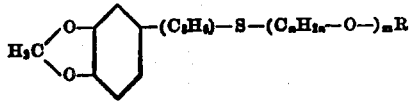

where $n$ is an integer 2 or 3, $m$ is an integer not greater than 3, and R is an univalent radical of the group consisting of alkyl, aryl, alkaryl and aralkyl radicals, and nuclear mono substituted aryl, alkaryl and aralkyl radicals in which the nuclear substituent is a member of the group consisting of halogen and alkoxy; and in the above formula, the portion to the right of the sulfur atom contains not more than 16 carbon atoms, and a petroleum distillate in which the compound is dissolved.

2. An insecticidal composition according to claim 1 in which the compound is represented by the formula

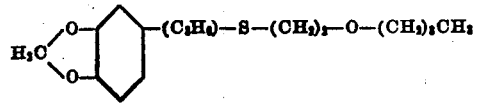

3. An insecticidal composition according to claim 1 in which the compound is represented by the formula

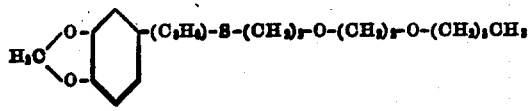

4. An insecticidal composition according to claim 1 in which the compound is represented by the formula

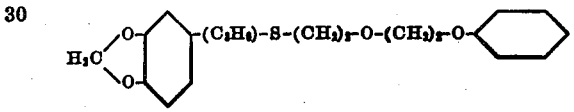

EDWARD A. PRILL.

REFERENCES CITED

The following references are of record in the file of this patent:

UNITED STATES PATENTS

| Number | Name | Date |
|---|---|---|
| 2,326,350 | Gertler et al. | Aug. 10, 1943 |
| 2,352,078 | Coleman | June 20, 1944 |
| 2,352,079 | Coleman | June 20, 1944 |
| 2,362,128 | Gertler et al. | Nov. 7, 1944 |
| 2,421,569 | La Forge | June 3, 1947 |
| 2,421,570 | La Forge | June 3, 1947 |
| 2,430,116 | Holmes | Nov. 4, 1947 |
| 2,431,844 | Synerholm | Dec. 2, 1947 |

OTHER REFERENCES

Soap and Sanitary Chemical, January 1943, pages 95 and 96, by Roark.

Contributions Boyce Thompson Institute, vol. 13, April–June 1943, pages 87–92, by Harvill et al.